United States Patent Office 2,773,070
Patented Dec. 4, 1956

2,773,070
CATALYTIC PROCESS FOR PRODUCING ALKYLENE CARBONATES

Myrl Lichtenwalter, Austin, and Justin F. Cooper, Port Arthur, Tex., assignors to Jefferson Chemical Company, Inc., New York, N. Y., a corporation of Delaware No Drawing. Application October 31, 1952,
Serial No. 318,082

13 Claims. (Cl. 260—340.2)

This invention relates to the production of alkylene carbonates by the reaction of alkylene oxides with carbon dioxide, and more particularly to such processes in which catalysts are employed for catalyzing the reaction, especially the reaction of ethylene oxide with carbon dioxide to form ethylene carbonate.

Reaction of ethylene oxide with carbon dioxide in the presence of sodium hydroxide on activated carbon as the catalyst has been suggested; however, this method is unsatisfactory for a number of reasons, chief of which is that it results in poor yields of ethylene carbonate badly contaminated with by-products.

It is an object of this invention to provide a catalytic process for producing alkylene carbonates by reacting alkylene oxides with carbon dioxide, which process results in an increase in yield, simplified processing, and products superior in purity.

It is another object of this invention to provide such procedure in which the catalyst may readily be recovered in a reusable form.

Still another object of this invention is to provide such process in which the reactants and catalyst are supplied continuously to the reaction zone, the reaction products are continuously withdrawn from the reaction zone and the catalyst and unreacted reactants removed from the reaction products and recycled to the reaction zone.

Other objects and advantages of this invention will be apparent from the following detailed description thereof.

In accordance with this invention, alkylene oxides are reacted with carbon dioxide in the presence of ammonium halides having the formula

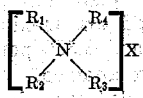

where X is any halide ion, and $R_1$, $R_2$, $R_3$, and $R_4$ may each be hydrogen, alkyl, aryl, alkenyl, alkaryl, or aralkyl in any combination or in which any two of the radicals $R_1$, $R_2$, $R_3$ and $R_4$ may be interconnected to form with the basic nitrogen atom a ring of the pyridine, piperidine, pyrrolidine, pyrroline, morpholine, or thiomorpholine series. Preferably the alkyl group contains from 1 to 20 carbon atoms, the aryl group is phenyl or naphthyl, the alkenyl group contains from 2 to 20 carbon atoms, the alkaryl group is an alkyl substituted phenyl or naphthyl in which the alkyl group contains from 1 to 4 carbon atoms and the aralkyl group is an alkyl group containing from 1 to 4 carbon atoms substituted by a phenyl or naphthyl radical.

The alkylene oxides which may be employed in the reaction are those of the oxirane system. Preferably, the alkylene oxides employed have a structural formula:

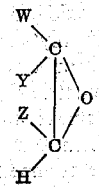

in which W, Y, and Z may be hydrogen, or the groups alkyl containing from 1 to 20 carbon atoms, aryl containing from 6 to 12 carbon atoms, cycloalkyl containing from 5 to 20 carbon atoms, alkenyl containing from 2 to 20 carbon atoms, or haloalkyl containing from 2 to 20 carbon atoms, or in which any two of the groups W, Y, and Z may be interconnected to form with the two carbon atoms shown in the formula a carbocyclic ring. At the present time ethylene oxide is the most important commercially, with propylene oxide probably next in commercial importance.

The reaction is carried out at a temperature of from 100° to about 225° C., preferably from 175° to 215° C., and under a pressure of more than 300 pounds per square inch gauge, preferably from about 1,000 to about 3,000 pounds per square inch gauge. The reaction may be conducted either batchwise or continuously. For example, the catalyst may be continuously introduced in solution form along with the alkylene oxide and the carbon dioxide under desired pressure into one end of a reaction vessel and the products of reaction continuously withdrawn from the other end. A preferred solvent for the catalyst is the alkylene carbonate reaction product or a tertiary alcohol, e. g., tertiary butyl or amyl alcohol. Alternatively, batches of the alkylene oxide and the catalyst may be introduced into an autoclave or bomb type of reactor, the desired pressure built up by introducing carbon dioxide and the reaction mixture agitated while being heated to the reaction temperature and maintained under a superatmospheric pressure of carbon dioxide. Irrespective of whether a batch or continuous procedure is followed, each unit weight of reactants and reaction products resulting therefrom is maintained at reaction temperature and pressure for from 1 to 90 minutes, preferably from 30 to 60 minutes. This time interval is referred to herein as the reaction time.

The alkylene oxide and carbon dioxide are mixed in proportions to provide an excess of carbon dioxide over and above the stoichiometric amount required for reaction. This excess may be of the order of from 1% to 500% by weight. An excess of alkylene oxide should be avoided because it results in undesired by-products, chiefly alkylene oxide polymers and creates something of an explosion hazard.

The ammonium halide may be obtained as such from any available source or produced in any desired manner. While ammonium iodides, bromides, chlorides, and fluorides are all of them effective in catalyzing the synthesis of alkylene carbonates from alkylene oxides and $CO_2$, we have found that the iodides and bromides are more effective than the chlorides and fluorides. We prefer to use the bromides since they are highly effective and in addition are much more stable under conditions of use than are the iodides, which tend to decompose on heating with evolution of elemental iodine which poses an additional purification problem. While the ammonium radical of our catalysts, as stated above, may be unsubstituted $(NH_4)^+$ or mono-, di-, tri-, or tetrasubstituted, we prefer to start with a tetrasubstituted ammonium halide so as to avoid reaction between the alkylene oxide and the "active" hydrogen atoms of an incompletely substituted ammonium radical of the catalyst.

As examples of preferred catalysts may be mentioned tetraethyl ammonium bromide, tetramethyl ammonium bromide, benzyltriethyl ammonium bromide, and tetrabutyl ammonium bromide. These catalysts may easily be produced by heating a tertiary amine with an alkyl bromide. Thus, from triethyl amine and benzyl bromide, benzyltriethyl ammonium bromide is obtained. The ammonium halide catalysts may be purified by crystallization from a suitable solvent; in most cases an alcohol may be used for this purification. Methyl and ethyl alcohols are satisfactory for this purification in the case of most ammonium halides; however, a preferred solvent for tetraethylammonium bromide is tertiary butyl alcohol in which the catalyst is almost completely insoluble at room temperature, but in which it is quite soluble near the boiling point. Tertiary amyl alcohol is similarly well suited for this use.

The amount of catalyst used in general should be from 0.1% to 10%, preferably from 1 to 5% based on the weight of the reaction mixture. In general, the greater the catalyst concentration, within these limits, the more rapid and complete the reaction.

It will be understood that in the claims the reference to ammonium halide includes compounds in the polymeric form as well as the monomers.

One of the chief advantages of these improved catalysts for the synthesis of alkylene carbonates is that the product alkylene carbonates may be distilled directly from the ammonium halide catalyst without damage to product or catalyst. Thus ethylene oxide may be reacted with carbon dioxide in the presence of tetraethyl ammonium bromide catalyst, and the product ethylene carbonate distilled off in a pure form, leaving behind a residue containing the catalyst which may be used again to catalyze the next batch. This property of the catalyst renders it particularly suited to continuous operation. Thus the reactants may be introduced continuously into a reactor from which a portion of the reaction mixture is continuously recirculated through the reactor. Another portion of this reaction mixture is continuously withdrawn, flashed to remove unreacted carbon dioxide and alkylene oxide which are compressed and returned to the reactor. The residue from the flashing treatment is subjected to distillation to separate the alkylene carbonate from the catalyst solution. Residual catalyst solution or slurry may be returned directly to the reactor. Once the process is in smooth operation, the amount of catalyst withdrawn from the reactor with the product is almost exactly balanced by the catalyst recovered from the product still and returned to the reactor; accordingly little fresh catalyst need be added to the reactor except occasionally to make up for losses. At times it may be desirable to discard a small portion of the recovered catalyst stream to prevent accumulation of unwanted by-products in the catalyst stream.

If it is desired to repurify the catalyst after use, this may be accomplished by distilling off most of the ethylene carbonate or other solvent such as the tertiary alcohol and adding acetone to the residue. The catalyst is almost completely insoluble in acetone and precipitates as a fine, light colored mass of crystals. Impurities, such as ethylene glycol, diethylene glycol, and polyethylene glycols are readily soluble in acetone and are thus easily removed with this solvent.

The following examples illustrate the invention, but are not to be regarded as limiting it in any way. In these examples all parts are by weight. In Examples I–IX, the reaction conditions of elevated temperatures and pressure were maintained as long as continuing reaction was evidenced by decreasing pressure. When pressure became constant, the reaction was assumed to have gone as far as it would, and the reactor was cooled and emptied.

*Example I*

2.64 parts of tetraethyl ammonium bromide are placed in a stainless steel autoclave, which is then evacuated. 264 parts of ethylene oxide are then charged into the autoclave, following which carbon dioxide is pressured into the autoclave to build up a pressure of 500 pounds per square inch at 40° C. and provide an excess of carbon dioxide over and above the stoichiometric amount required for the reaction. The reactor is then sealed, and heat is applied until the temperature reaches 200° C. and the pressure reaches 2,250 pounds per square inch gauge. After 30 minutes, the pressure has fallen to 1,400 pounds per square inch gauge, and the autoclave is cooled to room temperature and 517 parts of reaction mixture removed, which melts at 35° C. This is vacuum distilled at about 5 mm. pressure, and 512 parts of water-white ethylene carbonate, with a melting point of 36° C., is obtained. This amounts to a 97% yield on the basis of the ethylene oxide charged into the autoclave.

*Example II*

This example is similar to Example I; however, the catalyst employed is tetraethyl ammonium iodide. The maximum temperature is 245° C. and the maximum pressure is 3,000 pounds per square inch gauge. The reaction time is 15 minutes, and the yield of crude product amounts to 474 parts of material with a melting point of 34.9° C. Vacuum distillation gives 453 parts of a slightly yellow product melting at 35° C. The yield is thus about 86%, based on the ethylene oxide charged.

*Example III*

This is similar to Example I, except that aniline hydrobromide is used as catalyst. Maximum temperature is 197° C. and maximum pressure is 1,200 pounds per square inch gauge. Reaction time is 90 minutes. The yield of distilled product is 80.7% of theoretical.

*Example IV*

132 parts of ethylene oxide and 1.32 parts of triethylammonium bromide are charged into an electrically heated rocking autoclave, and carbon dioxide is then admitted until the pressure (at 40° C.) is 600 pounds per square inch. The amount of carbon dioxide introduced is well in excess of the stoichiometric equivalent of the ethylene oxide present. Agitation is commenced, and the autoclave is heated to 185° C. Pressure rises to a maximum of 1,450 pounds per square inch. After six minutes the autoclave is cooled and discharged. The crude product amounts to 254 parts, a yield of about 96%.

*Example V*

264 parts of ethylene oxide, 5.28 parts of phenyltrimethylammonium iodide, and 10 parts of ethylene carbonate solvent for the catalyst are charged into an electrically heated autoclave, and carbon dioxide in stoichiometric excess is introduced until the pressure (at 40° C.) is 600 pounds per square inch gauge. Agitation and heating are commenced, and maximum temperature and pressure of 195° C. and 2,600 pounds per square inch gauge, respectively, are attained. After 2 hours at 195° C., the autoclave is cooled, vented, and discharged. The crude product weighs 484 grams, indicating a yield of about 89%.

*Example VI*

264 parts of ethylene oxide, 2.64 parts of ammonium bromide, and 10 parts of ethylene carbonate solvent for the catalyst are placed in an electrically heated rocking autoclave, and then a stoichiometric excess of carbon dioxide is admitted to the autoclave until the pressure reaches 600 pounds per square inch at 40° C. Agitation and heating are commenced. The temperature is allowed to rise to 248° C., and the maximum pressure reached is 1,700 pounds per square inch. After 6 minutes at 248° C., the reaction vessel is cooled, vented, and discharged. The crude product amounts to 484 parts, indicating the yield is about 89%.

*Example VII*

246 parts of ethylene oxide, 5.3 parts of ammonium chloride, and 10 parts of ethylene carbonate solvent for the catalyst are placed in an electrically heated rocking autoclave, and a stoichiometric excess of carbon dioxide is introduced into the autoclave until the pressure reaches 600 pounds per square inch at a temperature of 40° C. Agitation and heating are commenced, and the temperature rises to 223° C., with the pressure rising to a maximum of 2,700 pounds per square inch. After 2 minutes at 223° C., the mixture is cooled and removed from the reactor. The crude product weighs 381 parts, indicating a yield of about 69%.

*Example VIII*

100 parts of cyclohexene oxide and 2 parts of tetraethyl ammonium bromide are charged into an electrically heated rocking autoclave. A stoichiometric excess of carbon dioxide is added until the pressure reaches 600 pounds per square inch at 40° C. Agitation is commenced, and the autoclave is heated to 180–190° C., at which temperature the pressure reaches a maximum of 925 pounds per square inch. After 1½ hours at this temperature, the pressure falls to 775 pounds per square inch. The mixture is cooled and removed from the reactor. The crude product is found to weigh 124 parts and is vacuum distilled at 3–4 mm. through a short unpacked column. Approximately 35% of the charge is recovered as unreacted cyclohexene oxide; the remaining distillate boils at 90–95° C. at 3–4 mm. Hg, is pale yellow, and melts at 41° C. This distilled cyclohexene carbonate represents a yield of about 50% based on the cyclohexene oxide charge to the reaction.

*Example IX*

100 parts of isobutylene oxide and 1 part of tetraethyl ammonium bromide are heated in a stirred autoclave with an excess of carbon dioxide for 2 hours at 170 to 180° C. During this heating, the pressure varies between 1,000 and 1,500 pounds per square inch. The crude product is distilled in vacuo. 126 parts of isobutylene carbonate distill off between 80 and 90° C. under a pressure of 5 mm. Hg. The product is water-white, freezes at 25.8° C., boils at 224° C. at 760 mm. Hg, has a refractive index at 30° C. of 1.4152, and a specific gravity (30° C./30° C.) of 1.1125.

*Example X*

Two parts of cetyl pyridinium bromide and 200 parts of ethylene oxide are placed in a stainless steel rocking autoclave provided with an electric heating jacket and the system is pressured to 800 pounds per square inch with a stoichiometric excess of carbon dioxide. Agitation is commenced and the temperature is raised to 185° C. and kept at that temperature for one-half hour, after which the system is allowed to cool to room temperature and the reaction mixture discharged. The crude reaction product amounts to 395 parts. By distillation 385 parts of ethylene carbonate are obtained (96% of theoretical), and a light tan crystalline residue is left which consists largely of cetyl pyridinium bromide which is suitable for reuse.

*Example XI*

2.5 parts of octadecyl trimethyl ammonium chloride and 290 parts of propylene oxide are placed in a stainless steel rocking autoclave provided with a heating jacket and pressured to 900 pounds with carbon dioxide, providing a substantial excess of carbon dioxide over propylene oxide. Agitation and heating are commenced and the temperature is allowed to rise to 165° C., at which point it is maintained for one hour. At the end of this period the reactor is cooled and its contents discharged. The crude product weighs 500 parts. Distillation gives 480 parts of pure propylene carbonate, representing a yield of 94%.

*Example XII*

4 parts of dimethyl p-toluidine hydrochloride and 288 parts of isobutylene oxide are placed in a stainless steel rocking autoclave and pressured with a stoichiometric excess of carbon dioxide until the pressure reaches 850 pounds per square inch. Heating and shaking are commenced and the temperature is allowed to reach 195° C., where it is kept for a period of one hour. The reactor is cooled and the contents removed. 400 parts of crude isobutylene carbonate are obtained. Distillation under reduced pressure yields 385 parts of very pure isobutylene carbonate, a yield of 83%.

*Example XIII*

3.8 parts of dimethyl piperidinium bromide and 196 parts of cyclohexene oxide are placed in a stainless steel rocking autoclave provided with a heating jacket, pressured with a stoichiometric excess of $CO_2$ at 900 pounds per square inch and heated with agitation to a temperature of 195° C. After one hour at this temperature the autoclave is cooled and the contents discharged. 275 parts of crude product are obtained which on distillation in vacuo gives 40 parts of unreacted cyclohexene oxide and 164 parts of cyclohexene carbonate boiling at 91 to 95° C. at a pressure of 3 to 4 mm. Hg. Thus, the yield is 58% on the basis of the cyclohexene oxide charged into the autoclave, and about 72% on the basis of the cyclohexene oxide not recovered as such.

*Example XIV*

5 parts of pyrrolidine hydrochloride and 180 parts of styrene oxide are treated as in the previous example with an excess of carbon dioxide at an initial pressure of 850 pounds per square inch and a temperature of 195° C. After one hour at this temperature the reactor is cooled and 235 parts of crude product are obtained which yield 220 parts of styrene carbonate on vacuum distillation at 0.1 mm. of mercury pressure. (Yield of 89%.)

*Example XV*

5 parts of morpholine hydrochloride and 260 parts of ethylene oxide are placed in an electrically heated rocking autoclave and a stoichiometric excess of carbon dioxide is introduced into the autoclave until the pressure reaches 900 pounds per square inch. Agitation and heating are commenced and the temperature is allowed to rise to 200° C. After one hour at this temperature the crude product is removed in the usual way and found to weigh 472 parts. Distillation yields 452 parts of purified ethylene carbonate, a yield of about 87%.

*Example XVI*

4 parts of 4,4-diethyl morpholinium iodide and 185 parts of epichlorohydrin are placed in a rocking autoclave into which carbon dioxide in excess of the theoretical requirement is then run until the pressure reaches 800 pounds per square inch. The mixture is heated with agitation to 150° C. After one hour the reactor is cooled and 256 parts of crude chloromethylethylene carbonate are obtained.

*Example XVII*

4 parts of thiomorpholine hydrochloride and 220 parts of ethylene oxide are heated with an excess of $CO_2$ under an initial pressure of 800 pounds per square inch to a temperature of 180° C. After one hour the autoclave is cooled to room temperature and the product removed. It is found to weigh 405 parts, and yields a very pure ethylene carbonate product by simple distillation, preferably under slight vacuum.

*Example XVIII*

4 parts of pyrroline hydrobromide and 216 parts of 1,2-butylene oxide are introduced into a stainless steel rocking autoclave provided with a heating jacket. A stoichiometric excess of carbon dioxide is introduced to an initial pressure of 700 pounds per square inch. Heating is commenced and the temperature is allowed to rise to 200° C. After one-half hour the reactor is cooled and the crude reaction mixture discharged and found to weigh 337 parts. Distillation at 20 mm. Hg gives 320 parts of 1,2-butylene carbonate, a yield of 92%.

Example XIX 5 parts of benzyl triethyl ammonium bromide and 144 parts of butadiene monoxide (vinyl ethylene oxide) are placed in a rocking autoclave provided with an electric heating jacket. Carbon dioxide in excess of the theoretical requirement is introduced to an initial pressure of 580 pounds per square inch. Heating is commenced and the temperature is allowed to rise to 180° C. 200 parts of crude are recovered which yield 180 parts of distilled vinyl ethylene carbonate, which is 78% of theoretical.

Example XX 10 parts of tetrabutyl ammonium bromide are placed in an autoclave with 105 parts of butadiene monoxide (vinyl ethylene oxide). Carbon dioxide in stoichiometric excess is introduced to an initial pressure of 800 pounds per square inch and the temperature is raised to 150° C. After one-half hour the reaction mixture is cooled and vinyl ethylene carbonate is obtained in yield of about 80%.

Example XXI 5 parts of diallyl diethyl ammonium bromide and 290 parts of propylene oxide are placed in an autoclave into which excess carbon dioxide is introduced to an initial pressure of 800 pounds per square inch. The mixture is heated with agitation to a temperature of 175° C. and kept at this temperature for one hour. At the end of this time the mixture is cooled and 490 parts of crude product is removed. On distillation this yields 475 parts of very pure propylene carbonate, which amounts to 93% of theoretical.

Example XXII 10 parts of Dowex-2, a commercially available ion-exchange resin containing quaternary ammonium chloride groups, are placed in a rocking autoclave provided with a heating jacket with 200 parts of ethylene oxide. Carbon dioxide in stoichiometric excess is introduced to an initial pressure of 850 pounds per square inch, and the autoclave is then heated with agitation until the temperature reaches 190° C. After one hour at this temperature, the autoclave is cooled and its contents removed. Vacuum distillation of the product yields 327 parts of pure ethylene carbonate, which amounts to about 82% of theoretical.

In the foregoing examples, the catalysts were used either without any solvent or with ethylene carbonate as the solvent. If desired, we may use other solvents. A particularly suitable solvent for our preferred catalyst, tetraethyl ammonium bromide, is tertiary butanol. At temperatures near its boiling point, tertiary butanol easily dissolves 10–15% of its weight of tetraethyl ammonium bromide. Unlike primary and secondary alcohols, tertiary alcohols do not react at all readily with ethylene oxide, and may therefore be employed as reaction solvents for ethylene oxide. Accordingly, we may employ the ammonium halide catalysts in tertiary butanol solution; in such case, the ethylene carbonate product from the reactor will contain tertiary butanol in addition to ethylene carbonate and ammonium halide catalyst. By distillation of this mixture the tertiary butanol and ethylene carbonate may be recovered as easily separable fractions, leaving a residue of catalyst which may be redissolved in tertiary butanol or given a preliminary purification by acetone treatment as described above.

Alkylene carbonates are useful as solvents, reagents, and chemical intermediates. They dissolve many resins and polymeric materials, for example, polyamides and acrylic polymers. They are useful in chemical synthesis for substituting a beta-hydroxyalkyl group in place of the active hydrogen atom of amines, alcohols, mercaptans, phenols, thiophenols, and carboxylic acids. Alkylene carbonates of present commercial interest are those containing from two to ten carbon atoms in the alkylene residue. At the present time, ethylene carbonate is of the greatest commercial importance.

It will be noted that the use of the catalyst embodying this invention not only results in a material improvement in yield, but in the ready recovery of the catalyst in a reusable condition. Moreover, in view of the fact that the catalyst is readily separable from the reaction mixture in a reusable form, this invention lends itself to continuous operation, the reactants and catalyst being continuously supplied to the reactor; the reaction product continuously withdrawn from the reactor, and the catalyst removed from the reaction mixture thus withdrawn and returned to the reactor.

It is to be understood that this invention is not restricted to the present disclosure, except as defined by the appended claims.

What is claimed is:

1. The process of preparing alkylene carbonates which comprises reacting an alkylene oxide with a molar excess of carbon dioxide at a temperature between 100 and 225° C. and a pressure in excess of 300 pounds per square inch gauge in the presence of an ammonium halide catalyst selected from the group consisting of (a) compounds having the formula

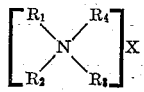

in which X is an ion selected from the group consisting of fluoride, chloride, bromide and iodide, and $R_1$, $R_2$, $R_3$, and $R_4$ are each radicals selected from the group consisting of (1) hydrogen, (2) alkyl containing from 1 to 20 carbon atoms, (3) phenyl, (4) lower alkenyl (5) alkylphenyl in which the alkyl group contains from 1 to 4 carbon atoms, and (6) phenyl-substituted alkyl radicals in which the alkyl group contains from 1 to 4 carbon atoms, and (b) compounds having the above noted formula in which $R_1$ and $R_2$ have the values above noted, and in which $R_3$ and $R_4$ are interconnected to form with the basic nitrogen atom a heterocyclic ring selected from the group consisting of the pyridine, piperidine, pyrrolidine, pyrroline, morpholine, and thiomorpholine series.

2. The process of producing ethylene carbonate which comprises reacting ethylene oxide with carbon dioxide at a temperature between 100 and 250° C. and at a pressure in excess of 300 lbs. per square inch in the presence of an ammonium halide catalyst selected from the group consisting of (a) compounds having the formula

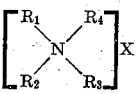

in which X is an ion selected from the group consisting of fluoride, chloride, bromide and iodide, and $R_1$, $R_2$, $R_3$, and $R_4$ are each radicals selected from the group consisting of (1) hydrogen, (2) alkyl containing from 1 to 20 carbon atoms, (3) phenyl, (4) lower alkenyl (5) alkylphenyl in which the alkyl group contains from 1 to 4 carbon atoms, and (6) phenyl-substituted alkyl radicals in which the alkyl group contains from 1 to 4 carbon atoms, and (b) compounds having the above noted formula in which $R_1$ and $R_2$ have the values above noted, and in which $R_3$ and $R_4$ are interconnected to form with the basic nitrogen atom a heterocyclic ring selected from the group consisting of the pyridine, piperidine, pyrrolidine, pyrroline, morpholine, and thiomorpholine series.

3. A process according to claim 2 in which the catalyst is tetraethylammonium iodide.

4. A process according to claim 2 in which the catalyst is triethylammonium bromide.

5. A process according to claim 2 in which the catalyst is ammonium bromide.

6. A process according to claim 2 in which the catalyst is ammonium chloride.

7. A process according to claim 2 in which the catalyst is tetraethylammonium bromide.

8. The process of manufacturing alkylene carbonates which comprises continuously supplying to a reaction zone maintained at a temperature between 100 and 250° C. and under a pressure of at least 300 pounds per square inch gauge a solution of an ammonium halide catalyst selected from the group consisting of (a) compounds having the formula

in which X is an ion from the group consisting of fluoride, chloride, bromide, and iodide, and $R_1$, $R_2$, $R_3$, and $R_4$ are each radicals selected from the group consisting of (1) hydrogen, (2) alkyl containing from 1 to 20 carbon atoms, (3) phenyl, (4) lower alkenyl, (5) alkylphenyl in which the alkyl group contains from 1 to 4 carbon atoms, and (6) phenyl-substituted alkyl radicals in which the alkyl group contains from 1 to 4 carbon atoms, and (b) compounds having the above noted formula in which $R_1$ and $R_2$ have the values above noted, and in which $R_3$ and $R_4$ are interconnected to form with the basic nitrogen atom a heterocyclic ring selected from the group consisting of the pyridine, piperidine, pyrrolidine, pyrroline, morpholine and thiomorpholine series.

9. A process according to claim 8 in which X is the chloride ion.

10. A process according to claim 8 in which X is the bromide ion.

11. A process according to claim 8 in which X is the iodide ion.

12. A process according to claim 8 in which the catalyst is tetraethyl ammonium bromide.

13. A process according to claim 8 in which the alkylene oxide employed is ethylene oxide and in which the catalyst is fed to the reaction zone as a solution in ethylene carbonate.

References Cited in the file of this patent

UNITED STATES PATENTS 2,511,942    Prichard _____ June 20, 1950

FOREIGN PATENTS 740,366    Germany _____ Oct. 19, 1943